J. NELSON.
STEERING WHEEL LOCK.
APPLICATION FILED APR. 2, 1920.

1,393,731.

Patented Oct. 11, 1921.

Inventor:
John Nelson
By Gillson & Gillson
Attys.

UNITED STATES PATENT OFFICE.

JOHN NELSON, OF CHICAGO, ILLINOIS.

STEERING-WHEEL LOCK.

1,393,731. Specification of Letters Patent. Patented Oct. 11, 1921.

Application filed April 2, 1920. Serial No. 370,731.

*To all whom it may concern:*

Be it known that I, JOHN NELSON, a citizen of the United States, and resident of Chicago, county of Cook, and State of Illinois, have invented certain new and useful Improvements in Steering-Wheel Locks, of which the following is a specification, and which are illustrated in the accompanying drawings, forming a part thereof.

The invention relates to automobile steering wheel locks, and has for an object the provision of a steering wheel which may be allowed to revolve freely without steering connection with the steering shaft and which can only be connected to the shaft for steering by the use of a key.

An illustrative embodiment of the invention is shown in the accompanying drawings, in which—

Figure 1:
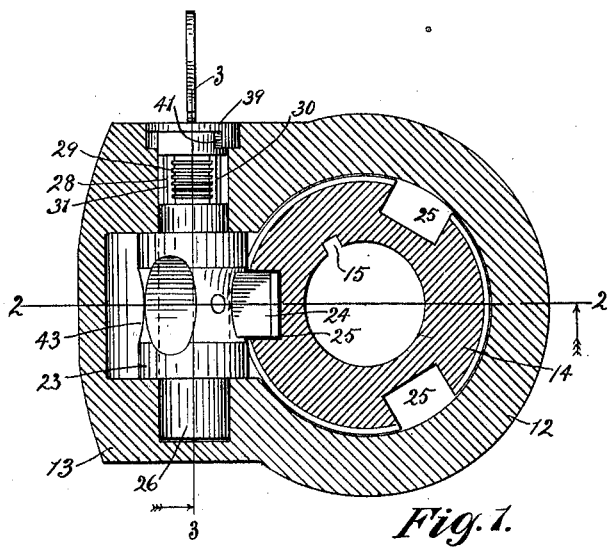
Figure 1 is a horizontal section on line 1—1 of Fig. 2.
Figure 3:
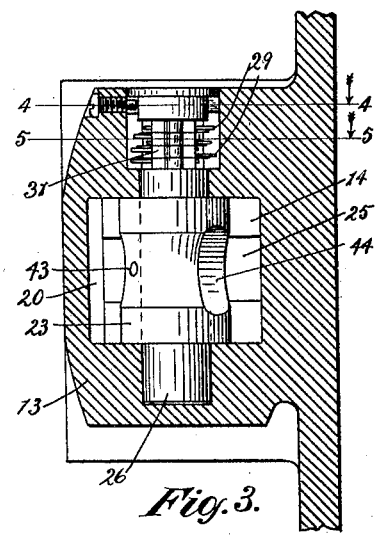
Fig. 3 is a vertical section on line 3—3 of Fig. 1 with the key removed.
Figure 2:
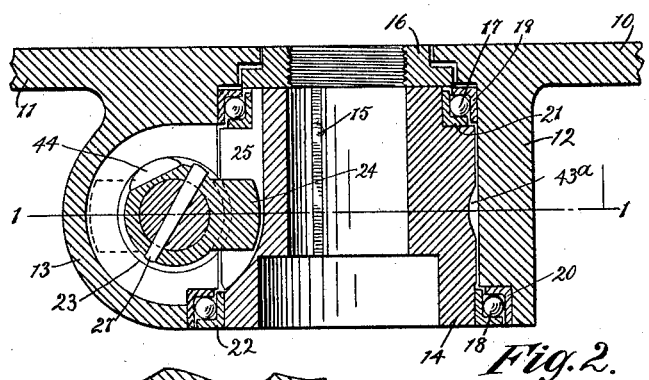
Fig. 2 is a vertical section on line 2—2 of Fig. 1.
Figure 6:
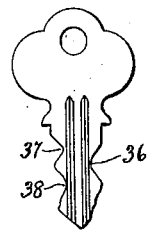
Figure 4:
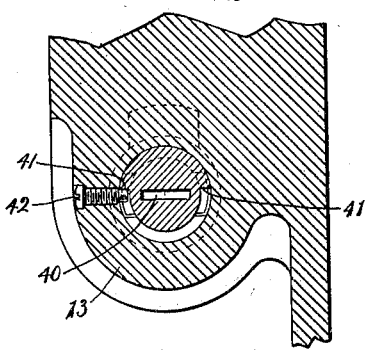
Figure 5:
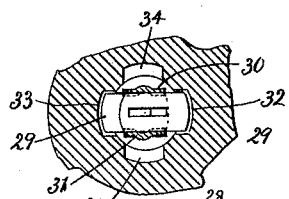

Figs. 4 and 5 are detail sections on lines 4—4 and 5—5, respectively, of Fig. 3; and Fig. 6 is a side view of a key for use with the lock.

Portions of two spokes of a steering wheel are indicated at 10, 11, and a hub at 12, which hub, with an enlargement 13 at one side, is designed to inclose the device. To make connection with the steering shaft (not shown) an inner hub 14 is shown, having a key-way 15 for reception of a key to prevent relative motion between the inner hub 14 and the steering shaft. To prevent removal of hub 14 from the steering shaft a lock nut 16 is provided, adapted to screw upon the steering shaft and to overlap the inner hub 14. A second nut, not shown, may be screwed upon the steering shaft above nut 16, and this nut will cover the joint between the wheel hub and the nut 16.

Since the security against theft, furnished by the invention, depends upon free revolution between the steering wheel 10, 11, and the inner hub 14 keyed to the steering shaft, the avoidance of friction between these parts is vital. If sufficient friction could be produced between these parts, as by bearing down on the wheel, it would be quite possible to steer the machine without a positive interlocking of the parts. To avoid such friction two sets of antifriction bearings, as 17 and 18, shown as ball bearings, are desirably provided. Under these circumstances the outer of each pair of races, as 19, 20, are carried by the outer hub 12, and the other races, as 21, 22, of each pair are carried by the inner hub 14.

To interlock the inner and outer hubs when the machine is to be steered, there is shown a bolt carrying hub 23, having a bolt 24 formed integral therewith, said bolt being adapted to be swung into engagement with any one of a plurality of slots 25, formed in the outer surface of the inner hub 14. The member 23 is shown as rigidly secured to a shaft 26, as by pin 27 passed through the parts, and the shaft 26 is journaled in the enlargement 13 of the hub 12.

To control the motion of rotation of shaft 26 and hub 23, a lock 28, of any suitable well known structure, may be provided. As shown, the lock comprises a series of leaves 29, alternate leaves of which series are caused by spring pressure to project from the two sides of the space between guides 30, 31, having slots in which the leaves are held. Diametrically spaced slots 32, 33, and 34, 35, are formed in the walls of the opening in which shaft 26 and the lock 30 rotate, which slots coact with the leaves 29 to prevent rotation of the shaft. Insertion of the key into the lock brings all the leaves 29 into alinement with the cylindrical surface of shaft 26, and hence turning of the key will rotate said shaft, carrying with it the bolt 24. While the leaves 29 are not in alinement with either pair of slots 32, 33, or 34, 35, the key cannot be removed, since removal of the key necessitates reciprocation of the leaves 29 out of the notches 36, 37, 38, of the key, which motion is prevented by the walls of the opening within which the lock turns.

To limit the rotation of the lock at definite points where the leaves 29 will be in alinement with slots 32, 33, the disk 39, having the key-hole 40, is cut away at its periphery for a portion of its height upward from the bottom and through a portion of its circumference, to provide shoulders 41, 41, and a screw 42 is provided projecting through the wall of the hub 12 and into the semi-annular rabbet resulting from the structure described. If the key be inserted and turned until the shoulders 41 come into contact with the screw and then the key withdrawn, the bolt will lie in one of the slots 25, which must be turned to register with the path of the bolt 24 in order to so turn the key. With the key removed the leaves 29 will rest in slots 32, 33, and the bolt 24 will be locked in place. Reverse rotation of the key will turn the bolt 24 through 180°, and removal of the key when shoulder 41 is in contact with screw 42 will lock the bolt 24 in inoperative position.

To prevent removal of the steering wheel when bolt 24 is locked in inoperative position by merely removing the outer lock nut (not shown) from the end of the steering column and lifting the wheel, inner hub 14 and hub 23 are each formed with a peripheral groove, as at 43 and 43ª, formed on a curve having a radius equal to that of the other part. When assembled the bottoms of these grooves are brought into close proximity to each other. Therefore, while each is permitted free rotation relative to the other, yet longitudinal movement of either relative to the other is prevented. The provision of the grooves 43 and 43ª furthermore provides that substantially the entire projecting portion of bolt 24 shall be engageable with the walls of a slot 25, instead of only the portion projecting beyond a plane tangent to hub 23 and contacting with the edges of a slot 25.

To assemble the device the inner hub 14 is first placed on the steering column and nut 16 is screwed on. Nut 16 has a polygonal periphery for coaction with a wrench and is overlapped in portions. The shaft 26 and hub 23 may be assembled with hub 12 and pin 27 may be placed from the center of the hub prior to placing the wheel upon the inner hub 14. To permit hub 23 to slip to position a flattened portion is formed thereon, as at 44. Prior to placing screw 42 in position the shaft 26 may be rotated to a position for this flattened portion to slip past the periphery of hub 14. An unauthorized person cannot reverse the process without the key to produce the rotation of shaft 26. By the term "key" is meant any usual means for actuating a lock, which means may be a removable article, usually termed a key or a knob, actuating said shaft by first working a combination.

Many changes may be made in the physical embodiment of the invention without departing from its spirit.

I claim as my invention—

1. Automobile steering mechanism comprising, in combination, a hub adapted to be keyed to a steering shaft and having a longitudinal slot in its periphery, a steering wheel hub mounted for free rotation on said first-named hub, a bolt-carrying hub mounted in said wheel hub for rotation on an axis at an angle to the axis of the steering shaft, and a bolt on said bolt-carrying hub adapted to be turned into and out of said slot at will.

2. Automobile steering mechanism comprising, in combination, a hub adapted to be keyed to a steering shaft and having a longitudinal slot in its periphery, a steering wheel hub mounted for free rotation on said first-named hub, a bolt-carrying hub mounted in said wheel hub for rotation on an axis at an angle to the axis of the steering shaft, a bolt on said bolt-carrying hub adapted to be turned into and out of said slot at will, and key operable means for controlling the action of said bolt-carrying hub.

3. Automobile steering mechanism comprising, in combination, a hub adapted to be keyed to a steering shaft and having a longitudinal slot in its periphery, a steering wheel hub mounted for free rotation on said first-named hub, anti-friction bearings between said hubs, a bolt-carrying hub mounted in said wheel hub for rotation on an axis at an angle to the axis of the steering shaft, and a bolt on said bolt-carrying hub adapted to be turned into and out of said slot at will.

4. Automobile steering mechanism comprising, in combination, a hub adapted to be keyed to a steering shaft, said hub having a longitudinal slot and a circumferential groove in its periphery, a steering wheel hub mounted for free rotation on said first-named hub, a bolt-carrying hub mounted in said wheel hub for rotation on an axis at an angle to the axis of the steering shaft, the periphery of said bolt-carrying hub projecting into said circumferential groove, a bolt carried by said bolt-carrying hub adapted to be turned into and out of said slot.

5. Automobile steering mechanism comprising, in combination, a hub adapted to be keyed to a steering shaft, said hub having a longitudinal slot and a circumferential groove in its periphery, a steering wheel hub mounted for free rotation on said first-named hub, a bolt-carrying hub mounted in said wheel hub for rotation on an axis at an angle to the axis of the steering shaft, the periphery of said bolt-carrying hub projecting into said circumferential groove, a bolt carried by said bolt-carrying hub adapted to be turned into and out of said slot, and key operable means for controlling the action of said bolt-carrying hub.

6. Automobile steering mechanism comprising, in combination, a hub adapted to be keyed to a steering shaft, said hub having a longitudinal slot and a circumferential groove in its periphery, a steering wheel hub mounted for free rotation on said first-named hub, a bolt-carrying hub mounted in said wheel hub for rotation on an axis at an angle to the axis of the steering shaft, the periphery of said bolt-carrying hub projecting into said circumferential groove and having a cut-away portion in its periphery to permit assembly of said wheel hub carrying said bolt-carrying hub with said steering shaft hub, and a bolt carried by said bolt-carrying hub adapted to be turned into and out of said slot.

7. Automobile steering mechanism comprising, in combination, a hub adapted to be keyed to a steering shaft, said hub having a longitudinal slot and a circumferential groove in its periphery, a steering wheel hub mounted for free rotation on said first-named hub, a locking hub mounted in said wheel hub for rotation on an axis at an angle to the axis of the steering shaft, the periphery of said locking hub projecting into said peripheral groove, said locking hub also having a peripheral groove partially embracing said first-named hub, a bolt carried by and projecting from said locking hub adapted to enter said slot with substantially its entire projection whereby the wheel hub may be at will locked with or freely revolve upon said first-named hub.

8. Automobile steering mechanism comprising, in combination, a hub adapted to be keyed to a steering shaft, said hub having a longitudinal slot and a circumferential groove in its periphery, a steering wheel hub mounted for free rotation on said first-named hub, a locking hub mounted in said wheel hub for rotation on an axis at an angle to the axis of the steering shaft, the periphery of said locking hub projecting into said peripheral groove, said locking hub also having a peripheral groove partially embracing said first-named hub, a bolt carried by and projecting from said locking hub adapted to enter said slot with substantially its entire projection, and key operable means for controlling the action of said locking hub whereby the wheel hub may be at will locked with or freely revolve upon said first-named hub.

9. Automobile steering mechanism comprising, in combination, a hub adapted to be keyed to a steering shaft, said hub having a longitudinal slot and a circumferential groove in its periphery, a steering wheel hub mounted for free rotation on said first named hub, a locking hub mounted in said wheel hub for rotation on an axis at an angle to the axis of the steering shaft, the periphery of said locking hub projecting into said peripheral groove, said locking hub also having a peripheral groove partially embracing said first named hub and having a cut away portion in its periphery to permit assembly of the parts, a bolt carried by and projecting from said locking hub adapted to enter said slot with substantially its entire projection whereby the wheel hub may be, at will, locked with or freely revolve upon said first named hub.

10. Automobile steering mechanism comprising, in combination, a steering shaft, a steering wheel revolubly mounted on said shaft, a locking member revolubly mounted on said wheel, a lock adapted to positively prevent rotation of said locking member when in locked condition, means whereby said locking member in all positions but one prevents removal of the wheel from the shaft, said locking member being revoluble to steering and to non-steering positions and to a position wherein the steering wheel may be removed from the shaft, a removable stop adapted at all times except when removed to prevent said locking member being revolved to wheel removing position not affecting the turning of the locking member between the said steering and non-steering positions.

11. The combination of a collar adapted to be secured to the end of a steering post and having a circumferential groove and one or more longitudinal slots therein, a cylindrical member fitting over said collar, a bolt mounted in said member and registering with said groove, a projection on said bolt for engagement with said slots, a lock for actuating said bolt, and means for securing a steering wheel to said cylindrical member.

12. The combination of a steering wheel having a tubular hub, a steering post having a collar fitting in said hub, a transverse bolt mounted in said hub and registering with a circumferential groove in the collar, said bolt having a bit adapted to register with longitudinal slots in the collar for operatively connecting the hub to the collar.

JOHN NELSON.